(12) United States Patent
Gomes et al.

(10) Patent No.: US 12,424,834 B2
(45) Date of Patent: Sep. 23, 2025

(54) SHIELDED ELECTRIC CABLE ASSEMBLY

(71) Applicant: YAZAKI EUROPE LTD., Great Britain (GB)

(72) Inventors: Bruno Miguel Vilar Martins Gomes, Maia (PT); Jorge Manuel Machado Regufe, Rio Tinto (PT); Sérgio Pedro da Silva Soares Fernandes, São Cosme (PT)

(73) Assignee: YAZAKI EUROPE LTD., Hertfordshire (GB)

( * ) Notice: Subject to any disclaimer, the term of this patent is extended or adjusted under 35 U.S.C. 154(b) by 231 days.

(21) Appl. No.: 18/182,531

(22) Filed: Mar. 13, 2023

(65) Prior Publication Data
US 2023/0318278 A1 Oct. 5, 2023

(30) Foreign Application Priority Data
Mar. 15, 2022 (EP) .................................... 22162232

(51) Int. Cl.
*H02G 15/188* (2006.01)
*H02G 15/013* (2006.01)

(52) U.S. Cl.
CPC ......... *H02G 15/188* (2013.01); *H02G 15/013* (2013.01)

(58) Field of Classification Search
None
See application file for complete search history.

(56) References Cited

U.S. PATENT DOCUMENTS 2,357,591 A * 9/1944 Kleinfelder .......... H02G 15/013
174/84 C
2,435,284 A 2/1948 Lodge
(Continued)

FOREIGN PATENT DOCUMENTS

CN 106451313 * 2/2017
CN 108429223 * 8/2018
(Continued)

OTHER PUBLICATIONS

Original and Translation of CN108233282 (Year: 2018).*
(Continued)

*Primary Examiner* — Timothy J. Dole
*Assistant Examiner* — Muhammed Azam
(74) *Attorney, Agent, or Firm* — Sughrue Mion, PLLC

(57) ABSTRACT

A shielded electric cable assembly including a first shielded electric cable having a first shield conductor covering a wire and being covered by a first insulative jacket. The shielded electric cable assembly further includes a second shielded electric cable having a second shield conductor covering a wire and being covered by a second insulative jacket, where the conductors of the first and second shielded electric cables are joined forming a junction. The shielded electric cable assembly further includes an inner insulator covering the junction, a shield element covering the inner insulator in contact to the first and second shield conductors, and a housing covering the shield element and the first and second insulative jackets. A first and a second sealing element are provided between the housing and the first and second insulative jackets.

15 Claims, 6 Drawing Sheets

(56) References Cited

U.S. PATENT DOCUMENTS

| | | | | |
|---|---|---|---|---|
| 2,930,835 | A * | 3/1960 | Bollmeier | H02G 15/24 220/279 |
| 3,441,659 | A * | 4/1969 | Laudig | H01R 4/20 439/879 |
| 3,787,607 | A | 1/1974 | Schlafly | |
| 3,912,854 | A * | 10/1975 | Thompson | H02G 15/18 174/76 |
| 3,982,319 | A * | 9/1976 | Bice | H02G 15/113 174/92 |
| 4,232,184 | A * | 11/1980 | Faust | H02G 15/013 174/41 |
| 4,503,283 | A * | 3/1985 | Hancock | H02G 15/24 174/76 |
| 4,538,021 | A * | 8/1985 | Williamson, Jr. | H02G 15/113 174/92 |
| 4,550,220 | A * | 10/1985 | Kitchens | H01R 4/70 174/92 |
| 4,558,174 | A * | 12/1985 | Massey | G02B 6/4447 174/92 |
| 5,021,611 | A * | 6/1991 | Amano | H02G 15/18 428/327 |
| 5,030,798 | A * | 7/1991 | Schilling | H02G 15/10 174/92 |
| 5,403,977 | A * | 4/1995 | Steptoe | H02G 15/1813 174/76 |
| 5,569,882 | A * | 10/1996 | Yokoyama | H02G 15/003 174/76 |
| 5,574,257 | A * | 11/1996 | Brauer | C10M 101/02 174/76 |
| 5,753,861 | A * | 5/1998 | Hansen | H02G 15/1826 174/136 |
| 5,817,978 | A | 10/1998 | Hermant et al. | |
| 6,103,975 | A * | 8/2000 | Krabs | H02G 15/188 174/74 A |
| 6,605,775 | B1 * | 8/2003 | Seeber | H05K 9/0066 439/607.41 |
| 6,735,861 | B1 * | 5/2004 | Angele | H02G 1/14 29/869 |
| 6,881,897 | B2 * | 4/2005 | Mita | H02G 15/085 174/59 |
| 8,209,855 | B2 * | 7/2012 | Hilberts | H01R 4/20 29/869 |
| 9,048,638 | B2 * | 6/2015 | Madden | H02G 1/14 |
| 9,136,040 | B2 * | 9/2015 | Zettervall | H01B 13/06 |
| 9,337,632 | B2 * | 5/2016 | Newman | H02G 15/115 |
| 9,530,544 | B2 * | 12/2016 | Islam | G02B 6/4416 |
| 9,660,434 | B2 * | 5/2017 | Kett | H02G 15/113 |
| 9,875,824 | B2 * | 1/2018 | Oga | H01B 7/282 |
| 9,906,003 | B1 | 2/2018 | Volpone | H01R 4/029 |
| 9,923,356 | B2 * | 3/2018 | Byczkiewicz | H02G 15/117 |
| 9,936,617 | B2 * | 4/2018 | Degen | H05K 9/0098 |
| 10,594,127 | B2 * | 3/2020 | Portillo Gallego | H02G 15/04 |
| 10,734,753 | B1 * | 8/2020 | Alawneh | H02G 1/14 |
| 10,770,832 | B2 * | 9/2020 | Franke | H02G 15/113 |
| 10,862,224 | B2 * | 12/2020 | Doring | H02G 15/105 |
| 11,101,582 | B2 * | 8/2021 | Duncan | H01R 43/0263 |
| 11,139,613 | B2 * | 10/2021 | Masumoto | H01R 13/516 |
| 11,489,304 | B2 * | 11/2022 | Patz | H01R 4/28 |
| 11,677,223 | B2 * | 6/2023 | Kempeneers | G02B 6/4442 174/6 |
| 11,777,265 | B2 * | 10/2023 | Olek | H02G 15/117 439/100 |
| 12,176,690 | B2 * | 12/2024 | Frank | H02G 15/117 |
| 2002/0040803 | A1 | 4/2002 | Buyst | |
| 2005/0115067 | A1 * | 6/2005 | Luzzi | H02G 15/188 29/745 |
| 2010/0025069 | A1 * | 2/2010 | Smith, III | H02G 15/184 174/98 |
| 2010/0276196 | A1 * | 11/2010 | Seraj | H02G 15/1833 174/84 R |
| 2014/0197958 | A1 * | 7/2014 | Madden | H02G 5/00 174/88 B |
| 2014/0262500 | A1 * | 9/2014 | Yaworski | H02G 15/184 174/84 R |
| 2015/0114711 | A1 * | 4/2015 | Dew | H01B 7/0045 174/72 A |
| 2015/0144394 | A1 * | 5/2015 | Webb | H02G 1/14 174/658 |
| 2015/0162737 | A1 * | 6/2015 | Newman | H02G 1/14 174/91 |
| 2016/0064914 | A1 * | 3/2016 | Janvrin | H02G 1/14 228/101 |
| 2016/0134096 | A1 | 5/2016 | Kett et al. | |
| 2017/0256925 | A1 * | 9/2017 | Patel | H02G 15/18 |
| 2018/0294629 | A1 * | 10/2018 | Volpone | H02G 15/113 |
| 2020/0287364 | A1 * | 9/2020 | Bier | H02G 5/00 |
| 2020/0412120 | A1 * | 12/2020 | Volpone | H01R 4/726 |
| 2023/0318278 | A1 * | 10/2023 | Gomes | H02G 15/188 174/73.1 |
| 2024/0136086 | A1 * | 4/2024 | Komori | H02G 1/14 |

FOREIGN PATENT DOCUMENTS

| | | | |
|---|---|---|---|
| DE | 60008743 | * | 7/2004 |
| DE | 102007006468 | * | 8/2008 |
| DE | 10 2013 011 874 A1 | | 1/2015 |
| DE | 102020120662 | * | 9/2021 |
| EP | 3 073 585 A1 | | 9/2016 |
| WO | WO2015182500 | * | 12/2015 |

OTHER PUBLICATIONS

Original and Translation of DE3941268 (Year: 1991).*
Original and Translation of DE60130267 (Year: 2008).*
Original and Translation of WO9636096 (Year: 1996).*
Original and Translation of AT513729 (Year: 2014).*
Extended European search report of EP 22 16 2232 dated Aug. 25, 2022.

* cited by examiner

SHIELDED ELECTRIC CABLE ASSEMBLY

BACKGROUND OF THE INVENTION

Field of the Invention

The invention refers to a shielded electric cable assembly comprising a first shielded electric cable having at least one conductor and a second shielded electric cable having at least one conductor wherein the conductors are electrically conductively joined together forming a junction. An inner insulator covers the junction. A shield element is arranged on the inner insulator being electrically connected to a first shield conductor of the first shielded electric cable and a second shield conductor of the second shielded electric cable.

Background

Such a shielded electric cable assembly is known from EP 3 073 585 A1. The inner insulator is a heat shrink tube. A plurality of ferrules overlays the first shield conductor and an insulating cover of the first cable and the second shield conductor and an insulating cover of the second cable. A plurality of ring collars overlays the plurality of ferrules and is fixed to the plurality of ferrules. The shield element overlays the first cable, second cable, plurality of ferrules, and plurality of ring collars and electromagnetically seals the junction between the conductors of the first cable and the second cable.

The object of the present invention is to provide a shielded electric cable assembly that can be easily manufactured.

SUMMARY OF THE INVENTION

The object of the invention is achieved by a shielded electric cable assembly comprising:
- a first shielded electric cable having at least one wire with a conductor and a first shield conductor at least partially axially covering the at least one wire, and having a first insulative jacket at least partially axially covering the first shield conductor;
- a second shielded electric cable having at least one wire with a conductor and a second shield conductor at least partially axially covering the at least one wire, and having a second insulative jacket least partially axially covering the second shield conductor,
- wherein the conductor of the at least one wire of the first shielded electric cable and the conductor of the at least one wire of the second shielded electric cable are electrically conductively joined together forming a junction;
- an inner insulator covering the junction, wherein the first shield conductor and the second shield conductor partially axially cover the inner insulator;
- a shield element covering at least partially axially the inner insulator in electrical conductive contact to the first shield conductor and the second shield conductor;
- a housing entirely covering the shield element and partially axially covering the first insulative jacket and the second insulative jacket;
- a first sealing element between the housing and the first insulative jacket; and
- a second sealing element between the housing and the second insulative jacket.

The fact that the shield conductors partially axially cover the inner insulator an easy connection between the shield element and the shield conductors is provided.

According to an embodiment of the invention the shield element defines an axial passage with a first opening, through which the first shielded electric cable is inserted, and an opposite second opening, through which the second shielded electric cable is inserted.

The housing may define an axial passage with a first opening, through which the first shielded electric cable is inserted, and an opposite second opening, through which the second shielded electric cable is inserted.

In an embodiment of the invention each shielded electric cable comprises a cable bushing seated partially axially on the insulative jacket of the respective shielded electric cable and partially axially on the shield element, wherein each cable bushing is axially arrange between the respective sealing element and the shield element.

Each cable bushing may have a plurality of tabs clamped onto the shield element and clamping the shield element onto the respective shield conductors. Thereby, the tabs clamp the shield element onto the shield conductors of the respective shielded electric cable assuring a reliable conductivity between the shield conductors and the shield element.

Each cable bushing can have a separation wall limiting an accommodation chamber receiving one of the sealing elements wherein the accommodation chamber is open to the outside and arranged between the housing and the insulative jacket of the respective shielded electric cable.

The sealing elements can be made of a potting compound, which can be injected into the accommodation chambers formed between the housing and the insulative jackets of the shielded electric cables. The separation walls ensure that no potting compound enters the housing beyond the separation walls.

At least one sealing ring may be arranged onto the insulative jacket of one of the shielded electric cables, wherein the sealing ring is over-molded by the potting compound of the respective sealing element. Sealing rings may be applied onto the insulative jackets of all shielded electric cables or only of a partial number of the shielded electric cables. Sealing rings are used in particularly if one of the insulative jackets is made of a flexible material decreasing the reliability of the sealing effect between the potting compound and the material of the insulative jacket due to different elasticities of the different materials. Especially in applications, in which one of the insulative jackets is made of non-adherent material (such as for instance silicone based materials) so that the potting material may have a poor bonding to the material of the insulative, jacket sealing rings enhance the sealing effect.

According to an exemplary embodiment of the invention the at least one wire of the first shielded electric cable comprises a first wire with a first conductor and a second wire with a second conductor. The at least one wire of the second shielded electric cable may comprise a first wire with a first conductor and a second wire with a second conductor. In this embodiment the first wires of the first shielded electric cable and of the second shielded electric cable are electrically conductively joined together forming a first junction. The second wires of the first shielded electric cable and of the second shielded electric cable are electrically conductively joined to together forming a second junction.

The shielded electric cable assembly may further comprise a third shielded electric cable having at least one wire with a conductor and a third shield conductor at least partially axially covering the at least one wire, wherein the third shield conductor is at least partially axially covered by a third insulative jacket. The conductor of the at least one wire of the first shielded electric cable, the conductor of the at least one wire of the second shielded electric cable and the conductor of the at least one wire of the third shielded electric cable are electrically conductively joined together forming a junction.

The object of the invention is also achieved by a method of manufacturing a shielded electric cable assembly, comprising the steps of:

providing a first shielded electric cable having at least one wire with a conductor and a first shield conductor at least partially axially covering the at least one wire, the first shield conductor is at least partially axially covered by a first insulative jacket;

providing a second shielded electric cable having at least one wire with a conductor and a second shield conductor at least partially axially covering the at least one wire, the second shield conductor is at least partially axially covered by a second insulative jacket, joining the conductor of the at least one wire of the first shielded electric cable and the conductor of the at least one wire of the second shielded electric cable electrically conductively together forming a junction;

covering the junction by arranging an inner insulator over the junction, arranging the first shield conductor and the second shield conductor partially axially over the inner insulator;

arranging a shield element over the inner insulator covering at least partially axially the inner insulator and electrically contacting the first shield conductor and the second shield conductor;

arranging a housing over the shield element covering the entire shield element and partially axially covering the first insulative jacket and the second insulative jacket;

arranging a first sealing element between the housing and the first insulative jacket; and arranging a second sealing element between the housing and the second insulative jacket.

The shield element may be arranged on the first shielded electric cable before joining the first conductor and the second conductor and subsequently moving the shield element axially over the junction.

The housing may be arranged on the first shielded electric cable before joining the conductor of the at least one wire of the first shielded electric cable and the conductor of the at least one wire of the second shielded electric cable. Subsequently, the housing can be moved axially over the shield element.

According to one embodiment of the method, the housing is arranged on the first shielded electric cable before the shield element is arranged on the first shielded electric cable between the housing and the second shielded electric cable.

For forming of the first sealing element and the second sealing element, potting compound may be injected between the housing and the first insulative jacket and between the housing and the second insulative jacket.

BRIEF DESCRIPTION OF THE DRAWINGS

The present invention will now be described, by way of example with reference to the accompanying drawings, in which.

DETAILED DESCRIPTION OF THE INVENTION

Figure 1:
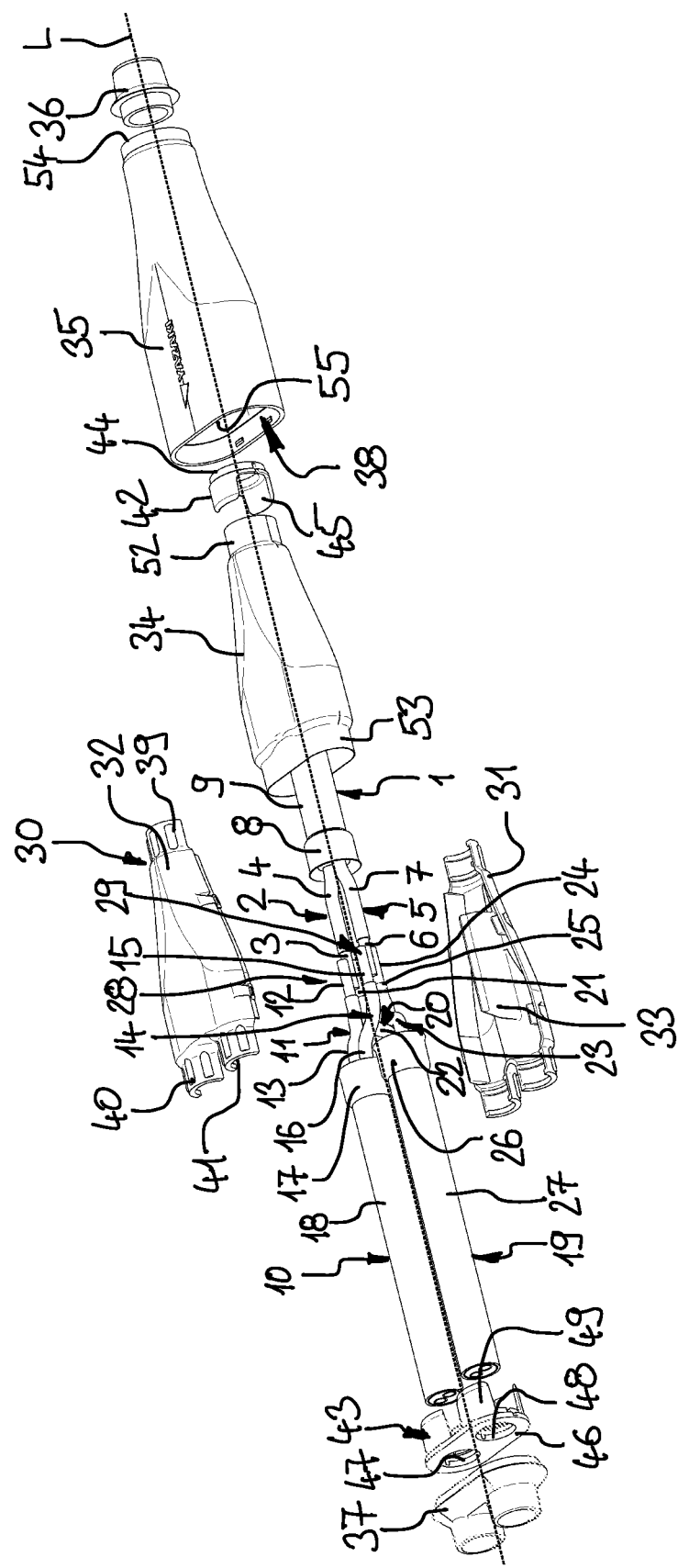
FIG. 1 is perspective exploded view of a first embodiment of a shielded electric cable assembly according to the invention.
Figure 2:
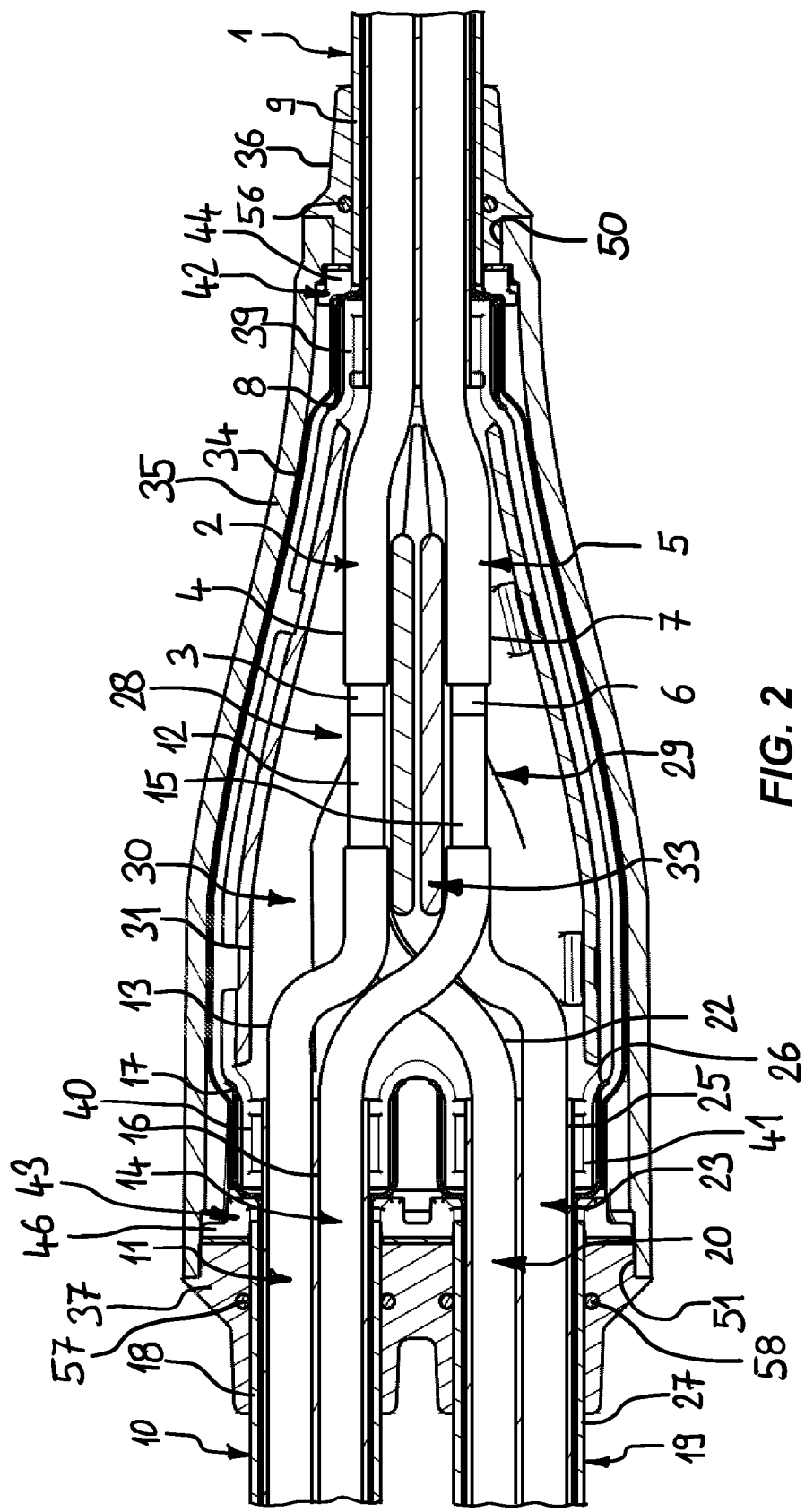
FIG. 2 is a sectional view of the assembled shielded electric cable assembly according to FIG. 1.

FIGS. 1 and 2 disclose a first embodiment of a shielded electric cable assembly according to the invention and are described together.

The shielded electric cable assembly comprises a first shielded electric cable 1 having a first wire 2 with a conductor 3 and an insulative cover 4. The insulative cover 4 of the first wire 2 at least partially axially covers the conductor 3 of the first wire 2. The first shielded electric cable 1 further comprises a second wire 5 with a conductor 6 and an insulative cover 7. The insulative cover 7 of the second wire 5 at least partially axially covers the conductor 6 of the second wire 5. The first wire 2 and the second wire 5 together with their respective conductors 3, 6 are covered at least partially axially by a first shield conductor 8. The first shield conductor 8 can be provided in the form of a braided tube-like element. Alternatively, the first shield conductor 8 can be provided in the form of a foil or any other element made of electrically conductive material that is able to electronically shield the conductors 3, 6 from an external environment. The first shield conductor 8 is covered at least partially axially by a first insulative jacket 9. The insulative covers 4, 7 and the first insulative jacket 9 are made of an electrically insulating material.

The shielded electric cable assembly further comprises a second shielded electric cable 10 having a first wire 11 with a conductor 12 and an insulative cover 13. The insulative cover 13 of the first wire 11 at least partially axially covers the conductor 12 of the first wire 11. The second shielded electric cable 10 further comprises a second wire 14 with a conductor 15 and an insulative cover 16. The insulative cover 16 of the second wire 14 at least partially axially covers the conductor 15 of the second wire 14. The first wire 11 and the second wire 14 together with their respective conductors 12, 15 are covered at least partially axially by a second shield conductor 17. The second shield conductor 17 can be provided in the form of a braided tube-like element. Alternatively, the second shield conductor 17 can be provided in the form of a foil or any other element made of electrically conductive material, which is able to electronically shield the conductors 12, 15 from an external environment. The second shield conductor 17 is covered at least partially axially by a second insulative jacket 18. The insulative covers 13, 16 and the second insulative jacket 18 are made of an electrically insulating material.

The shielded electric cable assembly further comprises a third shielded electric cable 19 having a first wire 20 with a conductor 21 and an insulative cover 22. The insulative cover 22 of the first wire 20 at least partially axially covers the conductor 21 of the first wire 20. The third shielded electric cable 19 further comprises a second wire 23 with a conductor 24 and an insulative cover 25. The insulative cover 25 of the second wire 23 at least partially axially covers the conductor 24 of the second wire 23. The first wire 20 and the second wire 23 together with their respective conductors 21, 24 are covered at least partially axially by a third shield conductor 26. The third shield conductor 26 can be provided in the form of a braided tube-like element. Alternatively, the third shield conductor 26 can be provided in the form of a foil or any other element made of electrically conductive material, which is able to electronically shield the conductors 21, 24 from an external environment. The third shield conductor 26 is covered at least partially axially by a third insulative jacket 27. The insulative covers 22, 25 and the third insulative jacket 27 are made of an electrically insulating material.

The shielded electric cable assembly may also comprise only the first shielded electric cable 1 and the second shielded electric cable 10. It is also conceivable that the shielded electric cable assembly has more than three shielded electric cables. As disclosed in a second embodiment later, each shielded electric cable may also have only one wire. It is also conceivable that the shielded electric cables have more than two wires.

The conductors 3, 12, 21 of all first wires 2, 11, 20 are electrically conductively joined together forming a first junction 28. In detail, this means that the conductor 3 of the first wire 2 of the first shielded electric cable 1, the conductor 12 of the first wire 11 of the second shielded electric cable 10 and the conductor 21 of the first wire 20 of the third shielded electric cable 19 are electrically conductively joined together forming the first junction 28.

The conductors 6, 15, 24 of all second wires 5, 14, 23 are electrically conductively joined together forming a second junction 29. In detail, this means that the conductor 6 of the second wire 5 of the first shielded electric cable 1, the conductor 15 of the second wire 14 of the second shielded electric cable 10 and the conductor 24 of the second wire 23 of the third shielded electric cable 19 are electrically conductively joined together forming the second junction 29.

An inner insulator 30 covers the first junction 28 and the second junction 29 insulating the first and second junctions 28, 29 electrically to the outside. The inner insulator 30 comprises a first insulative shell 31 and a second insulative shell 32, which are joined together. The first insulative shell 31 comprises a wall portion 33, which is arranged between the first junction 28 and the second junction 29 electrically insulating the junctions 28, 29 from each other.

A shield element 34 covers at least partially axially the inner insulator 30. The shield element 34 may be formed by a braided tube-like element, a housing, a foil or any other element made of electrically conductive material that is able to electronically shield the first and second junctions 28, 29 from an external environment. The shield element 34 is in electrical conductive contact to the first shield conductor 8, to the second shield conductor 17 and to the third shield conductor 26.

The shielded electric cable assembly further comprises a housing 35 that entirely covers the shield element 34. The housing 35 partially axially covers the first insulative jacket 9 and the second insulative jacket 18. In other words, the housing 35 is positioned on the first insulative jacket 9 of the first shielded electric cable 1, the shield element 34 and on the second insulative jacket 18 of the second shielded electric cable 10.

A first sealing element 36 is arranged between the housing 35 and the first insulative jacket 9 of the first shielded electric cable 1. A second sealing element 37 is arranged between the housing 35 and the second insulative jacket 18 of the second shielded electric cable 10. The second sealing element 37 is also positioned on the third insulative jacket 27 of the third shielded electric cable 19 sealing the third electric cable 19 against the housing 35.

The housing 35 forms a receptacle 38 for receiving the first and second junctions 28, 29, the inner insulator 30 and the shield element 34. This receptacle 38 is sealed to the outside by the first and second sealing elements 36, 37 to prevent water or other elements from entering the receptacle 38.

The inner insulator 30 defines an axial passage with a first opening defined by a first sleeve portion 39, a second opening defined by a second sleeve portion 40 and a third opening defined by a third sleeve portion 41. The first sleeve portion 39 is arranged opposite to the second sleeve portion 40 and the third sleeve portion 41 in a direction of a longitudinal axis L of the shielded electric cable assembly. The first and second wires 2, 5 of the first shielded electric cable 1 are inserted through the first opening defined by the first sleeve portion 39 into the inner insulator 30. The first and second wires 2, 5 are covered by a first insulative cover 59 according to this embodiment. However, it is also possible to lead the first and second wires 2, 5 directly into the inner insulator 30 without a first insulative cover.

The first and second wires 11, 14 of the second shielded electric cable 10 are inserted through the second opening defined by the second sleeve portion 40 into the inner insulator 30. According to the shown embodiment the first and second wires 11, 14 of the second shielded electric cable 10 are covered by a second insulative cover 60. However, it is also possible to lead the first and second wires 11, 14 directly into the inner insulator 30 without a second insulative cover.

The first and second wires 20, 23 of the third shielded electric cable 19 are inserted through the third opening defined by the third sleeve portion 41 into the inner insulator 30. According to the shown embodiment the first and second wires 20, 23 of the third shielded electric cable 19 are covered by a third insulative cover 61. However, it is also possible to lead the first and second wires 20, 23 directly into the inner insulator 30 without a third insulative cover.

The first shield conductor 8 covers at least partially axially the first sleeve portion 39 of the inner insulator 30. The second shield conductor 17 covers at least partially axially the second sleeve portion 40 of the inner insulator 30. The third shield conductor 26 covers at least partially axially the third sleeve portion 41 of the inner insulator 30.

The shield element 34 covers the inner insulator 30 and reaches at least partially axially over the first, second and third sleeve portions 39, 40, 41 contacting the first, second and third shield conductors 8, 17, 26.

In order to obtain a reliable electrical contact between the shield element 34 and the first, second and third shield conductors 8, 17, 26, a first cable bushing 42 and a second cable bushing 43 are provided. The first cable bushing 42 is arranged around the first insulative jacket 9 of the first shielded electric cable 1. The first cable bushing 42 has a separation wall 44 about the circumference of the first insulative jacket 9. In a direction towards the shield element 34, the first cable bushing 42 has tabs 45 axially extending from the separation wall 44 parallel to the longitudinal axis L. The tabs 45 partially cover the shield element 34 on the first sleeve portion 39 of the inner insulator 30.

The second cable bushing 43 has a separation wall 46 with two through holes 47, 48, through which the second shielded cable 10 and the third shielded cable 19 are guided. In a direction towards the shield element 34, the second cable bushing 43 has tabs 49 axially extending from the separation wall 46 parallel to the longitudinal axis L. The tabs 49 partially cover the shield element 34 on the second and third sleeve portions 40, 41 of the inner insulator 30.

Per each shielded electric cable 1, 10, 19 the cable bushings 42, 43 have a plurality of tabs 45, 49 that are clamped onto the shield element 34. Thereby, the tabs 45, 49 clamp the shield element 34 onto the shield conductors 8, 17, 26 of the respective shielded electric cable 1, 10, 19 assuring a reliable conductivity between the first, second and third shield conductors 8, 17, 26 and the shield element 34. The housing 35 may enhance this effect by applying an additional radial force onto the tabs 45, 49 and increasing the clamping effect after being pushed onto the shield element 34.

The separation walls 44, 46 each extend in a radial direction between the respective first, second and third insulative jacket 9, 18, 27 and the housing 35. The separation walls 44, 46 thereby limit accommodation chambers 50, 51 to accommodate the first and second sealing elements 36, 37. The accommodation chambers 50, 51 are, in an axial direction, open to the outside so that the first and second sealing elements 36, 37 can be manufactured by injecting a potting compound into the accommodation chambers 50, 51.

In the embodiment according to FIG. 2 sealing rings 56, 57, 58 are arranged on the first shielded electric cable 1, the second shielded electric cable 10 and the third shielded electric cable 19, respectively. The sealing rings 56, 57, 58 are over molded by the potting compound.

The sealing rings 56, 57, 58 are particularly applied if the first, second or third insulative jacket 9, 18, 27 are made of flexible material. Especially in applications, in which the first, second or third insulative jacket 9, 18, 27 are made of non-adherent material (such as for instance silicone based materials) so that the potting material may have a poor bonding to the material of the first, second or third insulative jacket 9, 18, 27 the sealing rings 56, 57, 58 enhance the sealing effect. It is conceivable that sealing rings are only applied onto a partial number of the shielded electric cables 1, 10, 19.

The shield element 34 defines an axial passage with a first opening defined by a first sleeve portion 52 and a second opening defined by a second sleeve portion 53. The first sleeve portion 52 defining the first opening is arranged opposite to the second sleeve portion 53 defining the second opening. The first shielded electric cable 1 is guided through the first opening defined by the first sleeve portion 52 into the sleeve element 34. The second and third shielded electric cables 10, 19 are guided through the second opening defined by the second sleeve portion 53 into the shield element 34.

The housing 35 defines also an axial passage with a first opening 54 and a second opening 55. The first and second openings 54, 55 are arranged on opposite sides. The first shielded electric cable 1 is guided through the first opening 54 into the housing 35. The second and third shielded electric cables 10, 19 are guided through the second opening 55 into the housing 35.

The FIGS. 3 to 10 each disclose a top view of the shielded electric cable assembly after different manufacturing steps to manufacture the shielded electric cable assembly.

In a first step the first shielded electric cable 1, the second shielded electric cable 10 and the third shielded electric cable 19 are provided. The first, second and third insulative jackets 9, 18, 27 are partially axially removed on end sections of the first, second and third shielded electric cables 1, 10, 19 exposing the respective first, second and third shield conductors 8, 17, 26. Further, end sections of the respective first and second wires 2, 5, 11, 14, 20, 23 are also exposed. At these end sections the insulative covers 4, 7, 13, 16, 22, 25 of the first and second wires 2, 5, 11, 14, 20, 23 are partially axially removed exposing the respective conductors 3, 6, 12, 15, 21, 24. The first, second and third insulative jackets 9, 18, 27 are pulled back away from the respective end sections of the first, second and third shielded electric cables 1, 10, 19 over the respective first, second and third insulative jackets 9, 18, 27.

In the following the first wires 2, 11, 20 of the first, second and third shielded electric cables 1, 10, 19 are joined electrically conductively together forming a first junction 28. The second wires 5, 14, 23 of the first, second and third shielded electric cables 1, 10, 19 are also joined electrically conductively together forming a second junction 29.

Figure 3:
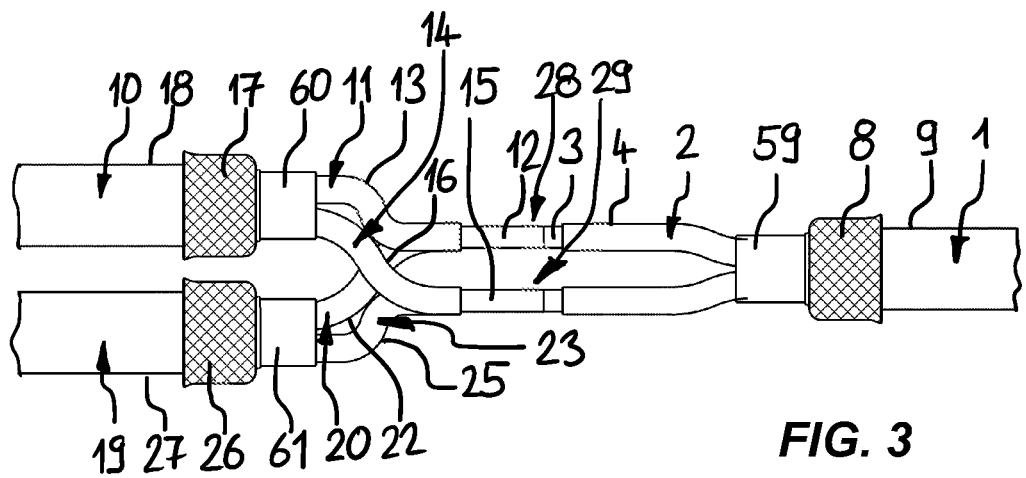
FIG. 3 is a top view of the shielded electric cable assembly according to FIG. 1 in a first stage of manufacturing.

FIG. 3 discloses a first stage of manufacturing after these manufacturing steps.

In a next step the first insulative shell 31 is arranged onto the end sections of the first, second and third shielded electric cables 1, 10, 19 covering the first and second junctions 28, 29. The wall portion 33 of the first insulative shell 31 is positioned between the first junction 28 and the second junction 29 to avoid an unintentional electric contact between the first and the second junctions 28, 29.

Figure 4:
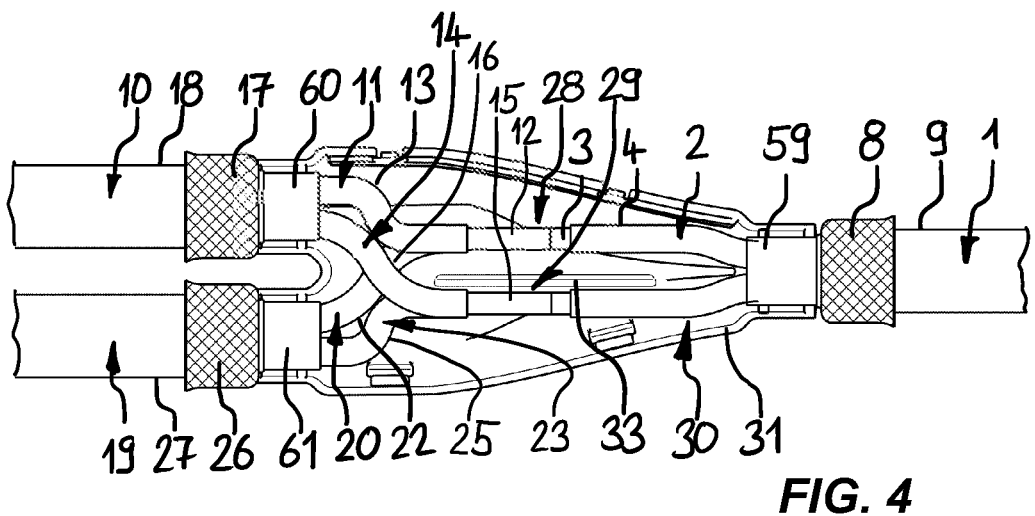
FIG. 4 is a top view of the shielded electric cable assembly according to FIG. 1 in a second stage of manufacturing.

FIG. 4 discloses a second stage of manufacturing after these manufacturing steps.

Subsequently, the second insulative shell 32 is connected to the first insulative shell 31 and positioned onto the end sections of the first, second and third shielded electric cables 1, 10, 19 covering the first and second junctions 28, 29.

Figure 5:
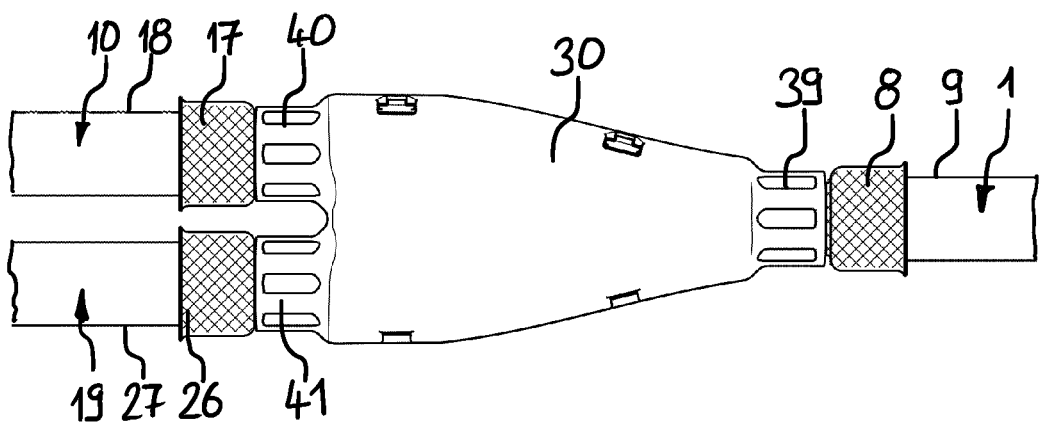
FIG. 5 is a top view of the shielded electric cable assembly according to FIG. 1 in a third stage of manufacturing.

FIG. 5 discloses a third stage of manufacturing after these manufacturing steps.

In a next step, the first shield conductor 8 is pushed forward towards the end section of the first electric cable 1 covering at least partially axially the first sleeve portion 39 of the inner insulator 30. The second shield conductor 17 is pushed forward towards the end section of the second electric cable 10 covering at least partially axially the second sleeve portion 40 of the inner insulator 30. Also, the third shield conductor 26 is pushed forward towards the end section of the third electric cable 19 covering at least partially axially the third sleeve portion 41 of the inner insulator 30.

Figure 6:
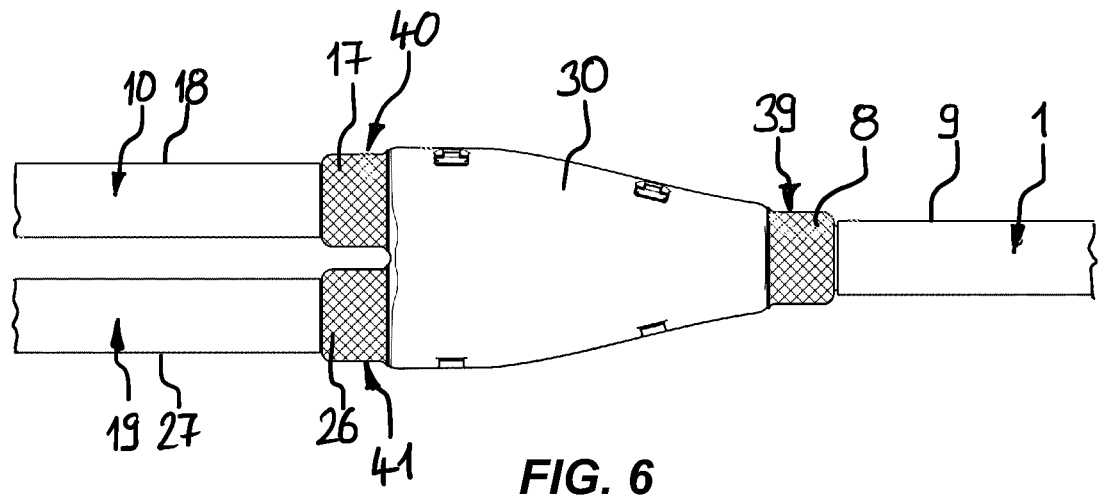
FIG. 6 is a top view of the shielded electric cable assembly according to FIG. 1 in a fourth stage of manufacturing.

FIG. 6 discloses a fourth stage of manufacturing after these manufacturing steps.

Afterwards, the shield element 34 is pushed over the inner insulator 30 covering same, wherein the shield element 34 is in electrical contact with the first, second and third shield conductors 8, 17, 26.

Figure 7:
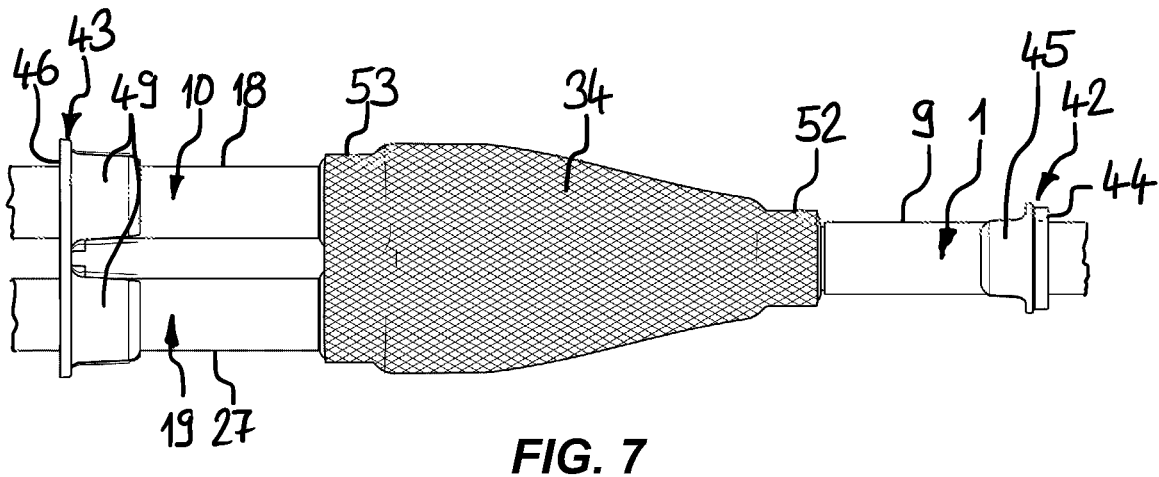
FIG. 7 is a top view of the shielded electric cable assembly according to FIG. 1 in a fifth stage of manufacturing.

A fifth stage after these manufacturing steps can be seen in FIG. 7.

In a further step the first cable bushing 42, which is arranged around the first insulative jacket 9 of the first shielded electric cable 1, is pushed with its tabs 45 axially onto the first sleeve portion 39 of the inner insulator 30 clamping the shield element 34 onto the first shield conductor 8.

The second cable bushing 43, which is arranged around the second insulative jacket 18 and around the third insulative jacket 27, is pushed with its tabs 49 axially onto the second sleeve portion 40 and the third sleeve portion 41 of the inner insulator 30 clamping the shield element 34 onto the second shield conductor 17 and the third shield conductor 26.

Figure 8:
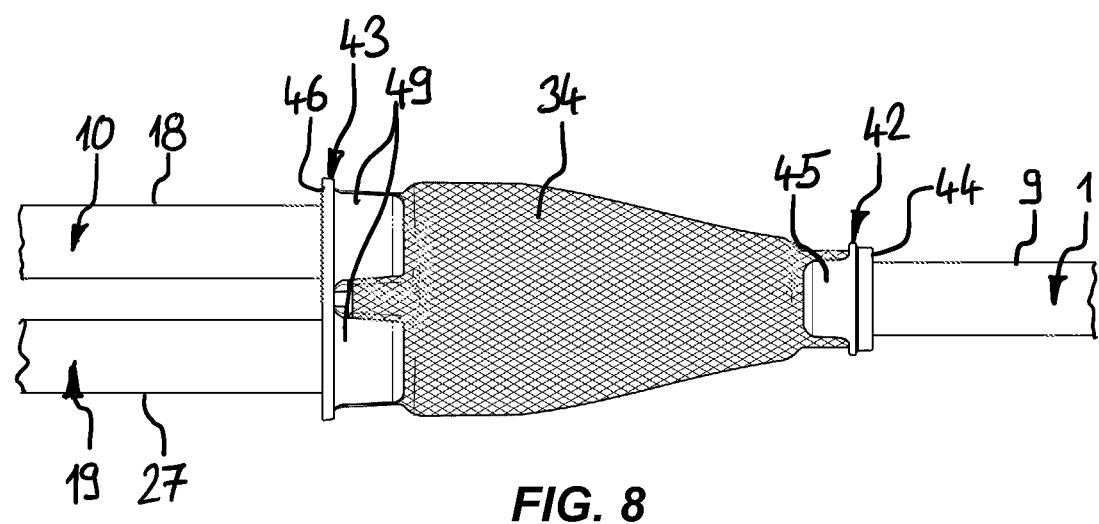
FIG. 8 is a top view of the shielded electric cable assembly according to FIG. 1 in a sixth stage of manufacturing.

A sixth stage after these manufacturing steps is depicted in FIG. 8.

Than the housing 35, which is arranged on the first shielded electric cable 1 is pushed onto the shield element 34 covering the entire shield element 34 and the first and second cable bushings 42, 43.

Figure 9:
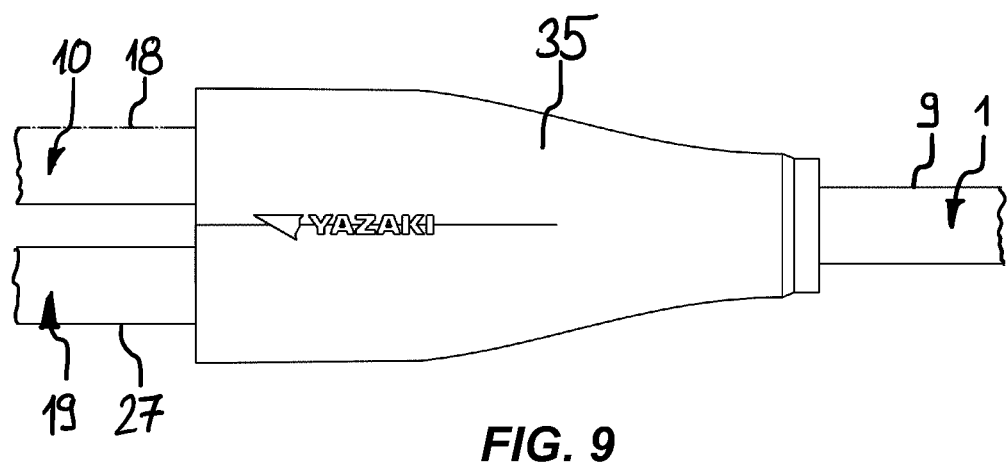
FIG. 9 is a top view of the shielded electric cable assembly according to FIG. 1 in a seventh stage of manufacturing.

A seventh stage of manufacturing the shielded electric cable assembly is shown in FIG. 9.

Finally, the first sealing element 36 and the second sealing element 37 are arranged in the first opening 54 and the second opening 55 of the housing 35. In the enclosed embodiment, the first and second sealing elements 36, 37 are manufactured by injection molding a potting compound into the accommodation chambers 50, 51 of the housing 35.

Figure 10:
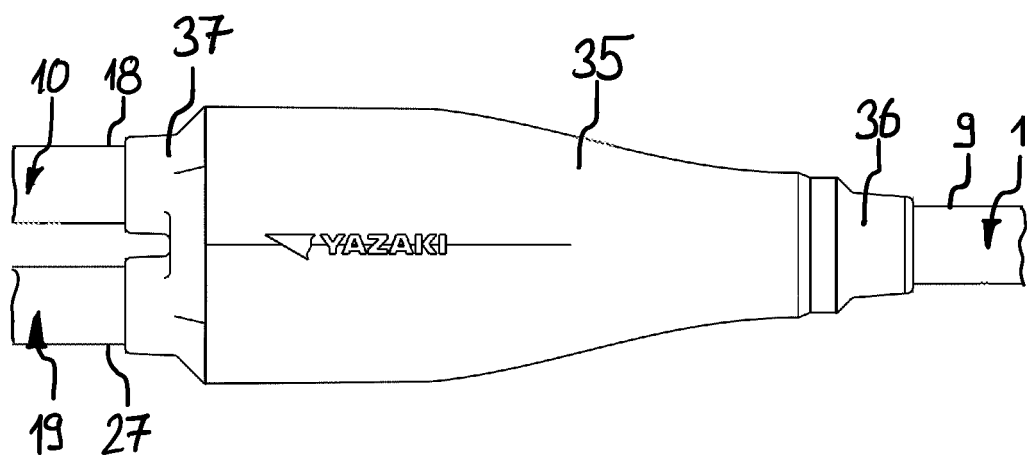
FIG. 10 is a top view of the shielded electric cable assembly according to FIG. 1 in a eighth stage of manufacturing.

The final eighth stage of manufacturing the shielded electric cable assembly is shown in FIG. 10.

Figure 11:
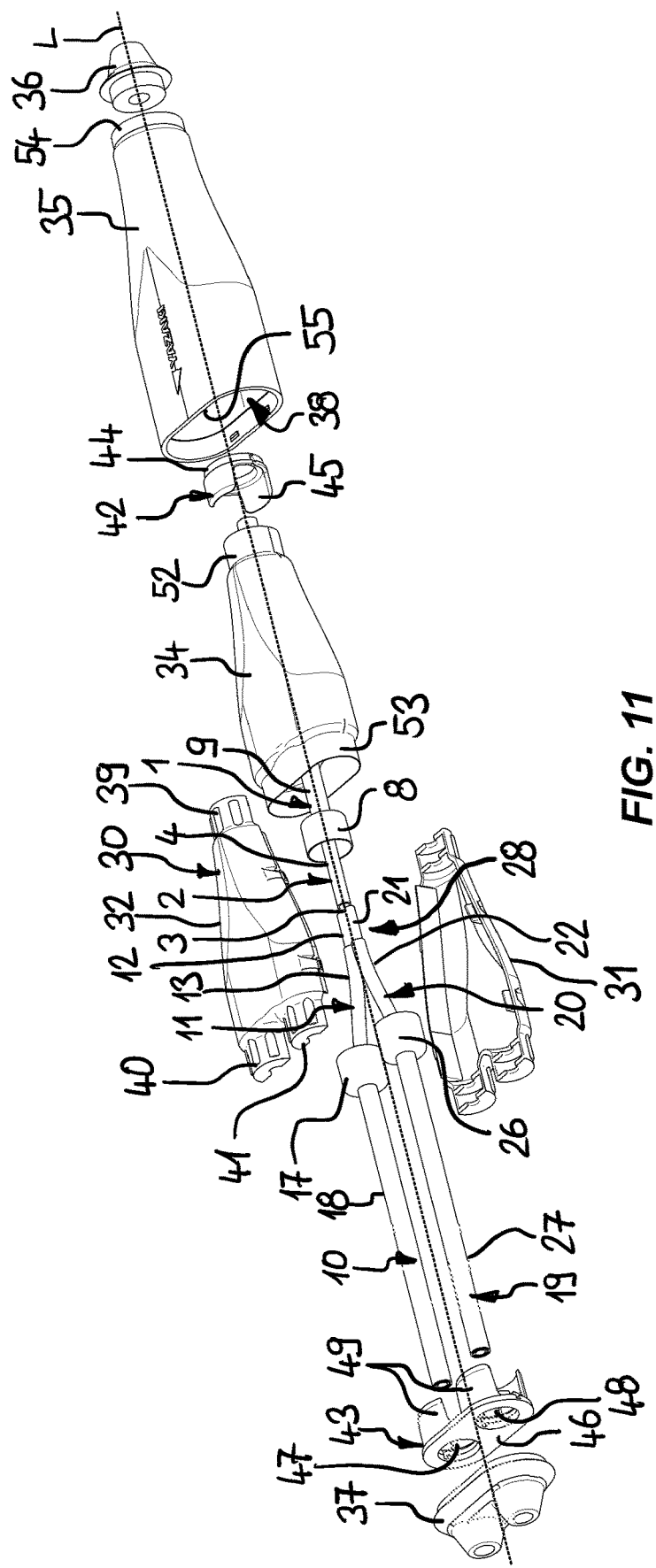
FIG. 11 is perspective exploded view of a second embodiment of a shielded electric cable assembly according to the invention.

FIG. 11 discloses a second embodiment of a shielded electric cable assembly according to the invention. Components and elements which are identical to those of the first embodiment are provided with the same reference numerals and are described in connection with the first embodiment.

In contrast to the first embodiment, the second embodiment has first, second and third shielded electric cables 1, 10, 19 that are each provided with only one wire 2, 11, 20. Conceivable is also an embodiment with more than two wires per shielded electric cable.

REFERENCE NUMERALS 1 first shielded electric cable
2 first wire of first shielded electric cable
3 conductor of first wire of first shielded electric cable
4 insulative cover of first wire of first shielded electric cable
5 second wire of first shielded electric cable
6 conductor of second wire of first shielded electric cable
7 insulative cover of second wire of first shielded electric cable
8 first shield conductor
9 first insulative jacket
10 second shielded electric cable
11 first wire of second shielded electric cable
12 conductor of first wire of second shielded electric cable
13 insulative cover of first wire of second shielded electric cable
14 second wire of second shielded electric cable
15 conductor of second wire of second shielded electric cable
16 insulative cover of second wire of second shielded electric cable
17 second shield conductor
18 second insulative jacket
19 third shielded electric cable
20 first wire of third shielded electric cable
21 conductor of first wire of third shielded electric cable
22 insulative cover of first wire of third shielded electric cable
23 second wire of third shielded electric cable
24 conductor of second wire of third shielded electric cable
25 insulative cover of second wire of third shielded electric cable
26 third shield conductor
27 third insulative jacket
28 first junction
29 second junction
30 inner insulator
31 first insulative shell
32 second insulative shell
33 wall portion
34 shield element
35 housing
36 first sealing element
37 second sealing element
38 receptacle
39 first sleeve portion of the inner insulator
40 second sleeve portion of the inner insulator
41 third sleeve portion of the inner insulator
42 first cable bushing
43 second cable bushing
44 separation wall of the first cable bushing
45 tab of the first cable bushing
46 separation wall of the second cable bushing
47 through hole
48 through hole
49 tab of the second cable bushing
50 accommodation chamber
51 accommodation chamber
52 first sleeve portion of the shield element
53 second sleeve portion of the shield element
54 first opening
55 second opening
56 sealing ring
57 sealing ring
58 sealing ring
59 first insulative cover
60 second insulative cover
61 third insulative cover.

The invention claimed is:

1. A shielded electric cable assembly comprising:
a first shielded electric cable having at least one wire with a conductor and a first shield conductor at least partially axially covering the at least one wire, and having a first insulative jacket at least partially axially covering the first shield conductor;
a second shielded electric cable having at least one wire with a conductor and a second shield conductor at least partially axially covering the at least one wire, and having a second insulative jacket at least partially axially covering the second shield conductor,
wherein the conductor of the at least one wire of the first shielded electric cable and the conductor of the at least one wire of the second shielded electric cable are electrically conductively joined together forming a junction;

an inner insulator covering the junction, wherein the inner insulator has a first sleeve portion and a second sleeve portion, through which the at least one wire of the first shielded electric cable and the at least one wire of the second shielded electric cable are inserted, wherein the first shield conductor partially axially covers the first sleeve portion of the inner insulator and the second shield conductor partially axially covers the second sleeve portion of the inner insulator;

a shield element covering at least partially axially the inner insulator in electrical conductive contact to the first shield conductor and the second shield conductor;

a housing entirely covering the shield element and partially axially covering the first insulative jacket and the second insulative jacket;

a first sealing element between the housing and the first insulative jacket; and a second sealing element between the housing and the second insulative jacket.

2. The shielded electric cable assembly according to claim 1, wherein the inner insulator defines an axial passage with a first opening, through which the at least one wire of the first shielded electric cable is inserted, and an opposite second opening, through which the at least one wire of the second shielded electric cable is inserted.

3. The shielded electric cable assembly according to claim 1, wherein the shield element defines an axial passage with a first opening, through which the first shielded electric cable is inserted, and an opposite second opening, through which the second shielded electric cable is inserted.

4. The shielded electric cable assembly according to claim 1, wherein the housing defines an axial passage with a first opening, through which the first shielded electric cable is inserted, and an opposite second opening, through which the second shielded electric cable is inserted.

5. The shielded electric cable assembly according to claim 1, wherein the sealing elements are made of a potting compound.

6. The shielded electric cable assembly according to claim 1, wherein each shielded electric cable comprises a cable bushing seated partially axially on the insulative jacket of the respective shielded electric cable and partially axially on the shield element, wherein each cable bushing is axially arranged between the respective sealing element and the shield element.

7. The shielded electric cable assembly according to claim 6, wherein each cable bushing comprises a plurality of tabs clamped onto the shield element and clamping the shield element onto the respective shield conductors.

8. The shielded electric cable assembly according to claim 6, wherein each cable bushing has a separation wall limiting an accommodation chamber receiving one of the sealing elements wherein the accommodation chambers are open to the outside and arranged between the housing and the insulative jacket of the respective shielded electric cable.

9. The shielded electric cable assembly according to claim 1, wherein the at least one wire with the conductor of the first shielded electric cable comprises a first wire with a first conductor and a second wire with a second conductor;

wherein the at least one wire with the conductor of the second shielded electric cable comprises a first wire with a first conductor and a second wire with a second conductor;

wherein the first wires of the first shielded electric cable and of the second shielded electric cable are electrically conductively joined to together forming a first junction; and wherein the second wires of the first shielded electric cable and of the second shielded electric cable are electrically conductively joined to together forming a second junction.

10. The shielded electric cable assembly according to claim 1, wherein the shielded electric cable assembly further comprising a third shielded electric cable having at least one wire with a conductor and a third shield conductor at least partially axially covering the at least one wire, the third shield conductor is at least partially axially covered by a third insulative jacket; and wherein the conductor of the at least one wire of the first shielded electric cable, the conductor of the at least one wire of the second shielded electric cable and the conductor of the at least one wire of the third shielded electric cable are electrically conductively joined together forming a junction.

11. A method of manufacturing a shielded electric cable assembly, comprising steps of:

providing a first shielded electric cable having at least one wire with a conductor and a first shield conductor at least partially axially covering the at least one wire, the first shield conductor is at least partially axially covered by a first insulative jacket;

providing a second shielded electric cable having at least one wire with a conductor and a second shield conductor at least partially axially covering the at least one wire, the second shield conductor is at least partially axially covered by a second insulative jacket, joining the conductor of the at least one wire of the first shielded electric cable and the conductor of the at least one wire of the second shielded electric cable electrically conductively together forming a junction;

covering the junction by arranging an inner insulator over the junction, wherein the inner insulator has a first sleeve portion and a second sleeve portion, through which the at least one wire of the first shielded electric cable and the at least one wire of the second shielded electric cable are inserted;

arranging the first shield conductor partially axially over the first sleeve portion of the inner insulator and the second shield conductor partially axially over the second sleeve portion of the inner insulator;

arranging a shield element over the inner insulator covering at least partially axially the inner insulator and electrically contacting the first shield conductor and the second shield conductor;

arranging a housing over the shield element covering the entire shield element and partially axially covering the first insulative jacket and the second insulative jacket;

arranging a first sealing element between the housing and the first insulative jacket; and arranging a second sealing element between the housing and the second insulative jacket.

12. The method according to claim 11, further comprising the steps of:
arranging the shield element on the first shielded electric cable before joining the conductor of the at least one wire of the first shielded electric cable and the conductor of the at least one wire of the second shielded electric cable; and
subsequently moving the shield element axially over the junction.

13. The method according to claim 11, further comprising the steps of:
arranging the housing on the first shielded electric cable before joining the conductor of the at least one wire of the first shielded electric cable and the conductor of the at least one wire of the second shielded electric cable; and
subsequently moving the housing axially over the shield element.

14. The method according to claim 11,
wherein the housing is arranged on the first shielded electric cable before the shield element is arranged on the first shielded electric cable between the housing and the second shielded electric cable.

15. The method according to claim 11,
wherein potting compound is injected between the housing and the first insulative jacket and between the housing and the second insulative jacket forming the first sealing element and the second sealing element.

* * * * *